United States Patent
Liu

(10) Patent No.: US 11,388,694 B2
(45) Date of Patent: Jul. 12, 2022

(54) PAGING SYNCHRONIZATION INDICATION METHOD AND DEVICE, PAGING SYNCHRONIZATION METHOD AND DEVICE, AND BASE STATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/011,742

(22) Filed: Sep. 3, 2020

(65) Prior Publication Data
US 2020/0404616 A1 Dec. 24, 2020

Related U.S. Application Data

(63) Continuation of application No. PCT/CN2018/080952, filed on Mar. 28, 2018.

(51) Int. Cl.
*H04W 68/00* (2009.01)
*H04W 76/27* (2018.01)
(Continued)

(52) U.S. Cl.
CPC ..... *H04W 68/005* (2013.01); *H04W 52/0216* (2013.01); *H04W 56/001* (2013.01);
(Continued)

(58) Field of Classification Search
CPC ............... H04W 68/005; H04W 76/27; H04W 52/0216; H04W 56/001; H04W 68/02; H04W 72/005
(Continued)

(56) References Cited

U.S. PATENT DOCUMENTS

2017/0094624 A1 3/2017 Balachandran et al.
2017/0215078 A1* 7/2017 Mochizuki ............ H04W 84/10
(Continued)

FOREIGN PATENT DOCUMENTS

CN 106793058 A 5/2017
CN 107079404 A 8/2017
(Continued)

OTHER PUBLICATIONS

Ericsson. "Synchronization Using Non-cell-defining Signals", 3GPP TSG RAN WG1 Meeting #91, R1-1720944, Nov. 18, 2017 (Nov. 18, 2017), section 2.3.
(Continued)

*Primary Examiner* — Nghi H Ly
(74) *Attorney, Agent, or Firm* — Syncoda LLC; Feng Ma

(57) ABSTRACT

A paging synchronization indication method includes: adding indication information into a Radio Resource Control (RRC) signaling, the indication information being used for indicating whether a non-cell-defining Synchronization Broadcast Block (SSB) is capable of being used for establishing paging synchronization; and transmitting, to User Equipment (UE), the RRC signaling added with the indication information and paging configuration information used for configuring a paging occasion respectively. The indication information and the paging configuration information jointly serve as a received information set of the UE.

18 Claims, 10 Drawing Sheets

(51) Int. Cl.
*H04W 52/02* (2009.01)
*H04W 56/00* (2009.01)
*H04W 68/02* (2009.01)
*H04W 72/00* (2009.01)

(52) U.S. Cl.
CPC ......... *H04W 68/02* (2013.01); *H04W 72/005* (2013.01); *H04W 76/27* (2018.02)

(58) Field of Classification Search
USPC ................ 370/329, 328, 338, 341, 345, 350
See application file for complete search history.

(56) References Cited

U.S. PATENT DOCUMENTS

2018/0026698 A1    1/2018  Lee et al.
2018/0288737 A1*  10/2018  Islam .................. H04W 72/042

FOREIGN PATENT DOCUMENTS

CN    107124767 A    9/2017
WO   2018045307 A1   3/2018

OTHER PUBLICATIONS

Samsung. "Remaining Details on Synchronization Signal", 3GPP TSG RAN WG1#90b, R1-1717576, Oct. 2, 2017 (Oct. 2, 2017), entire document.
Ericsson, On NR paging design, 3GPP TSG RAN WG1 Meeting #90 R1-1714039, Aug. 25, 2017 (Aug. 25, 2017), entire document.
Ericsson, On NR paging design, 3GPP TSG-RAN WG1 Meeting #88-bis R1-176013, Apr. 7, 2017 (Apr. 7, 2017), entire document.
International Search Report in the international application No. PCT/CN2018/080952, dated Dec. 29, 2018.
First Office Action of the Chinese application No. 201880000533.6, dated Aug. 31, 2020.
CATT:"Issues on RX Beam Sweeping for Paging",3GPP Draft; R2-1801838 Issues on Rx Beam Sweeping Forpaging, 3rd Generation Partnership Project (3GPP),Mobile Competence Centre ; 650, Route Des Lucioles;F-06921 Sophia-Antipolis Cedex; France,vol. RAN WG2, No. Athens, Greece; Feb. 26, 2018-Mar. 2, 2018 Feb. 12, 2018 (Feb. 2018 i 2), XP051398934,Retrieved from the Internet: URL:http://www.3gpp.org/ftp/tsg%5Fran/WG2%5FRL2JTSG R2%5F101 IDocs/[retrieved on Feb. 12, 2018].
Ericsson:"Additional synchronization provision",3GPP Draft;R1-1717761_Additional Sync Provisioning, 3rdGeneration Partnership Project (3GPP), MobileCompetence Centre ; 650, Route Des Lucioles ; F-06921Sophia-Antipolis Cedex; France,vol. RAN WG1, No. Prague, Czech Republic; Oct. 9, 2017-Oct. 13, 2017 Oct. 8, 2017 (Oct. 8, 2017), XP051340946,Retrieved from the Internet:URL:http://www.3gpp.org/ftp/Meetings_3GPP SYNC/RAN1 /Docs/[retrieved on Oct. 8, 2017].
Ericsson: I Paging design,3GPP Draft; R1-1718714_Paging, 3rd Generationpartnership Project (3GPP), Mobile Competence Centre ;650, Route Des Lucioles ; F-06921 Sophia-Antipolis Cedex France,vol. RAN WG 1, No. Prague, Czech Republic; Oct. 9, 2017-Oct. 13, 2017 Oct. 8, 2017 (Oct. 8, 2017), XP051341887,Retrieved from the Internet:URL:http://www.3gpp.org/ftp/Meetings_3GPP SYNC/RAN1/Docs/ [retrieved on Oct. 8, 2017].
Supplementary European Search Report in the European application No. 18913019.8, dated Nov. 5, 2021.
Office Action of the Indian application No. 202047046323, dated Dec. 6, 2021.

* cited by examiner

PAGING SYNCHRONIZATION INDICATION METHOD AND DEVICE, PAGING SYNCHRONIZATION METHOD AND DEVICE, AND BASE STATION

CROSS-REFERENCE TO RELATED APPLICATION

This is a continuation of International Application PCT/CN2018/080952 filed on Mar. 28, 2018, the disclosure of which is hereby incorporated by reference in its entity.

BACKGROUND

With the rapid development of the wireless communication technologies, the 5th generation (5G) mobile communication technology emerges. In a 5G system, a Synchronization Broadcast Block (SSB) is the only beacon channel that is always present. The SSB has a cycle ranging from 5 milliseconds (ms) to 160 ms. Furthermore, the 3rd Generation Partnership Project (3GPP) decides to introduce a non-cell-defining SSB for measurement.

SUMMARY

The present disclosure generally relates to the technical field of communications, and more particularly ,to a method and device for indicating paging synchronization, a method and device for paging synchronization, a base station, User Equipment (UE) and a computer-readable storage medium.

A first aspect according to the embodiments of the disclosure provides a method for indicating paging synchronization applied to a base station, the method including: indication information is added into a Radio Resource Control (RRC) signaling, the indication information being used for indicating whether a non-cell-defining SSB is capable of being used for establishing paging synchronization; and the RRC signaling added with the indication information and paging configuration information used for configuring a paging occasion are transmitted to UE respectively, herein the indication information and the paging configuration information jointly serve as a received information set of the UE.

A second aspect according to the embodiments of the disclosure provides a method for paging synchronization applied to UE, the method including: an RRC signaling and paging configuration information are received from a base station respectively, the RRC signaling including indication information, the indication information being used for indicating whether a non-cell-defining SSB is capable of being used for establishing paging synchronization, and the paging configuration information being used for configuring a paging occasion; a distance between the non-cell-defining SSB and the paging occasion is compared with a distance between a cell-defining SSB and the paging occasion during a period in which an RRC connection is maintained; and the non-cell-defining SSB is adopted to establish the paging synchronization, in response to that the distance between the non-cell-defining SSB and the paging occasion is less than the distance between the cell-defining SSB and the paging occasion, and in response to determining that the non-cell-defining SSB has a QCL relationship with the paging occasion and the indication information is used for indicating that the non-cell-defining SSB is capable of being used for establishing the paging synchronization.

A third aspect according to the embodiments of the disclosure provides a device for indicating paging synchronization applied to a base station, the device including: a processor; and memory configured to store instructions executable by the processor, wherein the processor is configured to: add indication information into a Radio Resource Control (RRC) signaling, the indication information being used for indicating whether a non-cell-defining Synchronization Broadcast Block (SSB) is capable of being used for establishing paging synchronization; and transmit, to User Equipment (UE), the RRC signaling added with the indication information and paging configuration information used for configuring a paging occasion respectively, wherein the indication information and the paging configuration information jointly serve as a received information set of the UE.

A fourth aspect according to the embodiments of the disclosure provides a device for paging synchronization applied to UE, the device including: a processor; and memory configured to store instructions executable by the processor, wherein the processor is configured to: receive an RRC signaling and paging configuration information from a base station respectively, the RRC signaling including indication information, the indication information being used for indicating whether a non-cell-defining SSB is capable of being used for establishing paging synchronization, and the paging configuration information being used for configuring a paging occasion; compare a distance between the non-cell-defining SSB and the paging occasion with a distance between a cell-defining SSB and the paging occasion during a period in which an RRC connection is maintained; and adopt the non-cell-defining SSB to establish the paging synchronization, in response to that the distance between the non-cell-defining SSB and the paging occasion is less than the distance between the cell-defining SSB and the paging occasion, and in response to that the non-cell-defining SSB has a QCL relationship with the paging occasion and the indication information is used for indicating that the non-cell-defining SSB is capable of being used for establishing the paging synchronization.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
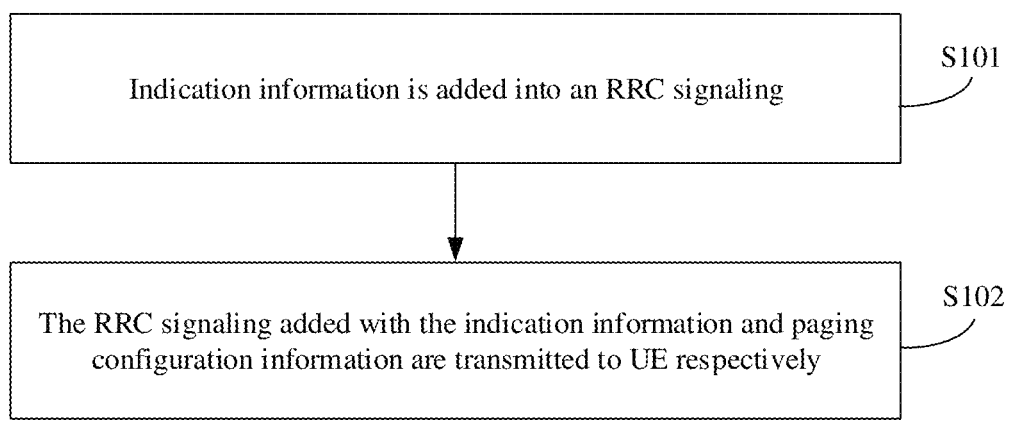
FIG. 1 is a flowchart of a method for indicating paging synchronization according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Paging reception is typically based on a cell-defining SSB. However, it is likely that establishment of paging synchronization based on the cell-defining SSB has a disadvantage of a long synchronization cycle, thus is not conducive to conserving the electricity energy of UE.

The 3GPP decides to introduce a non-cell-defining SSB for measurement. With a cycle of 20 ms taken as an example, a base station staggers the non-cell-defining SSB and a cell-defining SSB in time, and ensures that all the SSBs are same, have same beams and correspond to paging channels with same antenna properties. In this way, it is possible for the non-cell-defining SSB to be used in synchronization. Although the non-cell-defining SSB is obtained by UE in a connected state, the UE also receives paging in an inactive state in the connected state. Therefore, if such a non-cell-defining SSB is capable of being used for establishing the synchronization before the paging is received, the UE's active time will be reduced and UE will consume less electricity energy.

The SSB refers to a synchronization signal block or a Physical Broadcast Channel (PBCH) block. The cell-defining SSB refers to an SSB that indicates a control channel time-frequency position of corresponding Remaining System Information (RMSI). The non-cell-defining SSB refers to an SSB that does not indicate the control channel time-frequency position of corresponding RMSI.

FIG. 1 is a flowchart of a method for indicating paging synchronization according to some embodiments of the present disclosure. The embodiment gives description from the perspective of a base station side. As illustrated in FIG. 1, the method for indicating the paging synchronization includes operations S101 and S102.

In operation S101, indication information is added into an RRC signaling, the indication information being used for indicating whether a non-cell-defining SSB is capable of being used for establishing paging synchronization.

Figure 2:
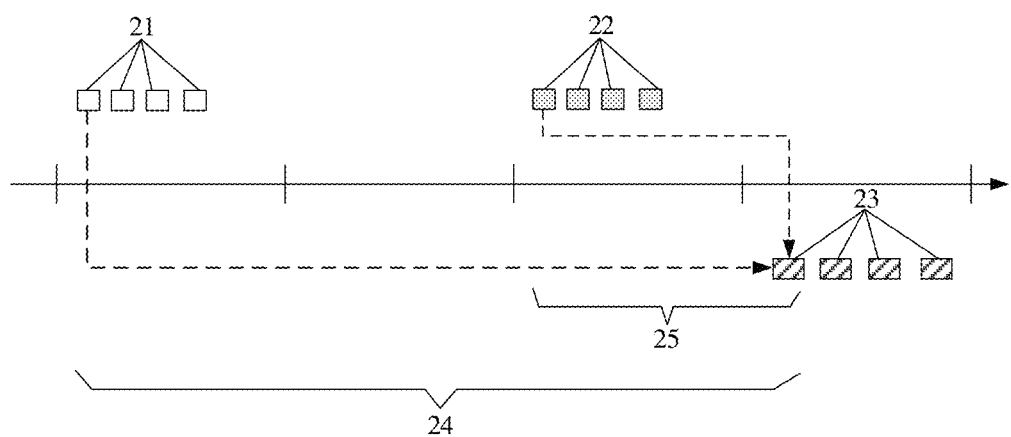
FIG. 2 is a schematic diagram of a relation between a cell-defining SSB, a non-cell-defining SSB, and a paging block according to some embodiments of the present disclosure.

As illustrated in FIG. 2, a cell-defining SSB 21 is transmitted periodically and a transmission cycle of a non-cell-defining SSB 22 is configured by the RRC signaling. A paging block 23 has one-to-one correspondence with the cell-defining SSB 21 but they correspond to different beams; furthermore the cell-defining SSB 21 has a QCL relationship with the paging block 23, that is to say, they can be considered to have consistent antenna reception parameters from a perspective of the UE reception. In this way, UE may receive the paging according to the cell-defining SSB 21. However, a paging occasion represented by the paging block 23 may be at a relatively long distance from the cell-defining SSB 21 so that the UE has a long wakeup time each time. For example, a wakeup time 24 illustrated in FIG. 2 is relatively long. The non-cell-defining SSB 22 is mainly used for measurement and is configured by a base station in the RRC signaling. Since the UE may retain a configuration parameter for the non-cell-defining SSB after the UE in a connected state enters an inactive state, the base station may add the indication information into the RRC signaling, for indicating whether the non-cell-defining SSB is capable of being used for establishing the paging synchronization.

It is to be noted that the distance mentioned in some embodiments refers to a time interval.

According to an embodiment of disclosure, the method may further include: whether the non-cell-defining SSB has the QCL relationship with the paging occasion is agreed on with the UE; and also may include: it is defined by default whether the non-cell-defining SSB has the QCL relationship with the paging occasion.

In some embodiments, if the non-cell-defining SSB does not have the QCL relationship with the paging occasion, the indication information is used for indicating that the non-cell-defining SSB is not capable of being used for establishing the paging synchronization. If the non-cell-defining SSB has the QCL relationship with the paging occasion, the indication information is used for indicating that the non-cell-defining SSB is capable of being used for establishing the paging synchronization.

In operation S102, the RRC signaling added with the indication information and paging configuration information used for configuring the paging occasion are transmitted to UE respectively. The indication information and the paging configuration information jointly serve as a received information set of the UE.

In the above embodiment, by transmitting the RRC signaling added with the indication information and paging configuration information to the UE, the UE is enabled to determine whether to adopt the non-cell-defining SSB or the cell-defining SSB to establish the paging synchronization. Therefore, it is possible to reduce UE's active time and is thus conducive to reducing the electricity energy consumed by the UE.

Figure 3:
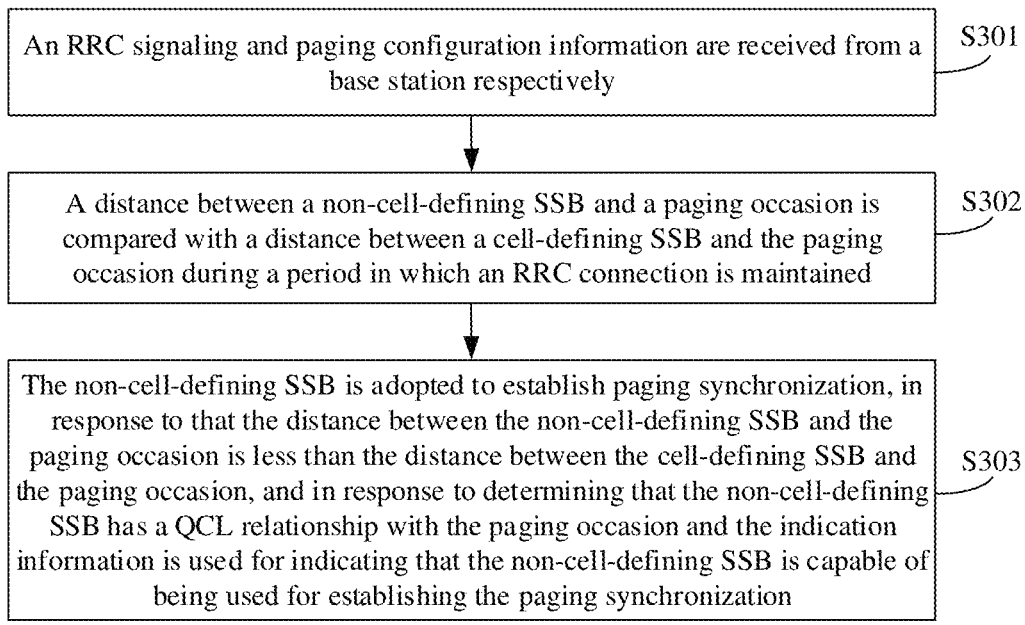
FIG. 3 is a flowchart of a method for paging synchronization according to some embodiments of the present disclosure.

FIG. 3 is a flowchart of a method for paging synchronization according to some embodiments of the present disclosure. The embodiment gives description from a perspective of a UE side. As illustrated in FIG. 3, the method for the paging synchronization includes operations S301 to S303.

In operation S301, an RRC signaling and paging configuration information are received from a base station respectively, the RRC signaling including indication information, the indication information being used for indicating whether a non-cell-defining SSB is capable of being used for establishing the paging synchronization, and the paging configuration information being used for configuring a paging occasion.

In some embodiments, the paging configuration information may also be used for configuring a position of the non-cell-defining SSB, herein the position of the non-cell-defining SSB is usually as close to the paging occasion as possible.

In operation 302, a distance between the non-cell-defining SSB and the paging occasion is compared with a distance between a cell-defining SSB and the paging occasion during a period in which an RRC connection is maintained.

The distance refers to a time interval.

In operation S303, the non-cell-defining SSB is adopted to establish the paging synchronization, in response to that the distance between the non-cell-defining SSB and the paging occasion is less than the distance between the cell-defining SSB and the paging occasion, and in response to determining that the non-cell-defining SSB has a QCL relationship with the paging occasion and the indication information is used for indicating that the non-cell-defining SSB is capable of being used for establishing the paging synchronization.

If the UE and the base station agree on that the non-cell-defining SSB has the QCL relationship with the paging occasion, it can be determined that the non-cell-defining SSB has the QCL relationship with the paging occasion. In addition, if the UE defines by default that the non-cell-defining SSB has the QCL relationship with the paging occasion, it can also be determined that the non-cell-defining SSB has the QCL relationship with the paging occasion.

In some embodiments, in response to that the distance between the non-cell-defining SSB and the paging occasion is less than the distance between the cell-defining SSB and the paging occasion, and in response to determining that the non-cell-defining SSB has the QCL relationship with the paging occasion and the indication information is used for indicating that the non-cell-defining SSB is capable of being used for establishing the paging synchronization, the UE establishes the paging synchronization at the position of the non-cell-defining SSB.

For example, in FIG. 2, since the distance between the non-cell-defining SSB 22 and the paging occasion, which is represented by the paging block 23, is less than the distance between the cell-defining SSB 21 and the paging occasion; furthermore, the UE determines that the non-cell-defining SSB has the QCL relationship with the paging occasion and the indication information is used for indicating that the non-cell-defining SSB is capable of being used for establishing the paging synchronization, the UE establishes the paging synchronization at the position of the non-cell-defining SSB. As can be seen from FIG. 2, a wakeup time 25 corresponding to the establishment of the paging synchronization at the position of the non-cell-defining SSB is less than the wakeup time 24 corresponding to the establishment of the paging synchronization at the position of the cell-defining SSB, it is thus conducive to reducing the electricity energy consumed by the UE.

In addition, if the non-cell-defining SSB does not have the QCL relationship with the paging occasion or the indication information is used for indicating that the non-cell-defining SSB is not capable of being used for establishing the paging synchronization, the UE establishes the paging synchronization at the position of the cell-defining SSB.

In the above embodiment, the non-cell-defining SSB is adopted to establish the paging synchronization in response to that the distance between the non-cell-defining SSB and the paging occasion is less than the distance between the cell-defining SSB and the paging occasion and in response to determining that the non-cell-defining SSB has the QCL relationship with the paging occasion and the indication information is used for indicating that the non-cell-defining SSB is capable of being used for establishing the paging synchronization. In this way, the UE's wakeup time is reduced, and it is thus conducive to reducing the electricity energy consumed by the UE.

Figure 4:
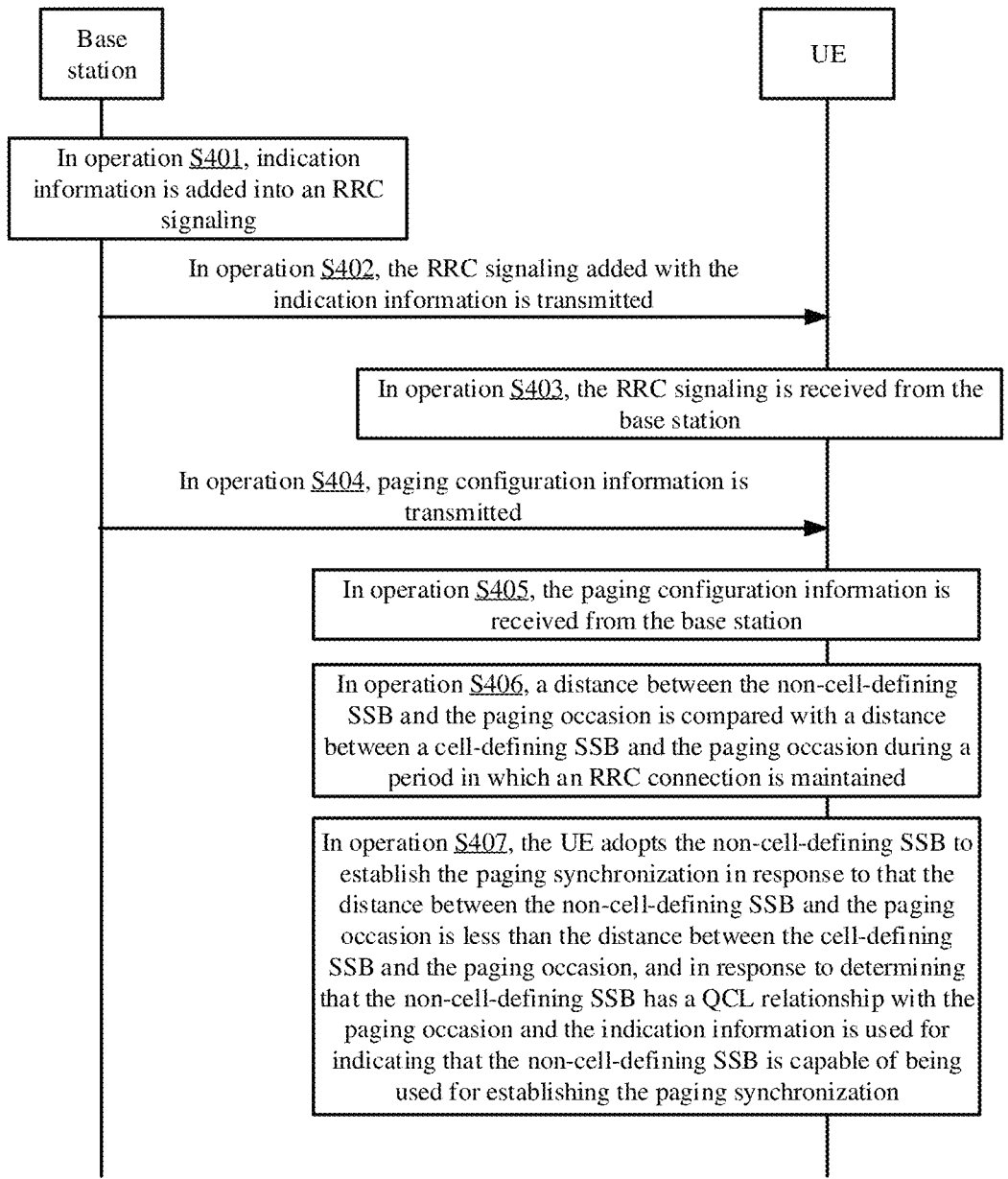
FIG. 4 is a signaling flowchart of a method for paging synchronization according to some embodiments of the present disclosure.

FIG. 4 is a signaling flowchart of a method for paging synchronization according to some embodiments of the present disclosure. The embodiment gives description from a perspective of interaction between a base station and UE. As illustrated in FIG. 4, the method for paging synchronization includes operations S401 to S407.

In operation S401, the base station adds indication information into an RRC signaling, the indication information being used for indicating whether a non-cell-defining SSB is capable of being used for establishing the paging synchronization.

In operation S402, the base station transmits the RRC signaling added with the indication information to the UE.

In operation S403, the UE receives the RRC signaling including the indication information from the base station.

In operation S404, the base station transmits paging configuration information used for configuring a paging occasion to the UE.

In operation S405, the UE receives the paging configuration information from the base station.

In operation S406, the UE compares a distance between the non-cell-defining SSB and the paging occasion with a distance between a cell-defining SSB and the paging occasion during a period in which an RRC connection is maintained.

In operation S407, the UE adopts the non-cell-defining SSB to establish the paging synchronization in response to that the distance between the non-cell-defining SSB and the paging occasion is less than the distance between the cell-defining SSB and the paging occasion, and in response to determining that the non-cell-defining SSB has a QCL relationship with the paging occasion and the indication information is used for indicating that the non-cell-defining SSB is capable of being used for establishing the paging synchronization.

In the above embodiment, the interaction between the base station and the UE enables the UE to determine, according to the indication information and the paging configuration information transmitted by the base station, whether to adopt the non-cell-defining SSB or the cell-defining SSB to establish the paging synchronization, so as to reduce the UE's active time. Thus, it is conducive to reducing the electricity energy consumed by the UE.

Figure 5:
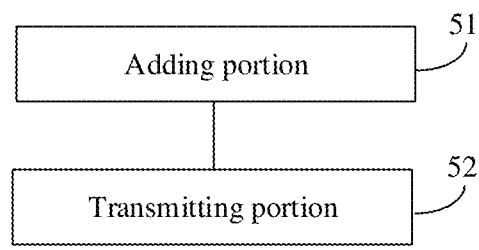
FIG. 5 is a block diagram of a device for indicating paging synchronization according to some embodiments of the present disclosure.

FIG. 5 is a block diagram of a device for indicating paging synchronization according to some embodiments of the present disclosure. The device may be located in a base station. As illustrated in FIG. 5, the device includes an adding portion 51 and a transmitting portion 52.

The adding portion 51 is configured to add indication information into an RRC signaling, the indication information being used for indicating whether a non-cell-defining SSB is capable of being used for establishing paging synchronization.

As illustrated in FIG. 2, a cell-defining SSB 21 is transmitted periodically and a transmission cycle of a non-cell-defining SSB 22 is configured by the RRC signaling. A paging block 23 has one-to-one correspondence with the cell-defining SSB 21 but they correspond to different beams;

furthermore, the cell-defining SSB 21 has a QCL relationship with the paging block 23, that is to say, they can be considered to have consistent antenna reception parameters from a perspective of the UE reception. In this way, UE may receive the paging according to the cell-defining SSB 21. However, a paging occasion represented by the paging block 23 may be at a relatively long distance from the cell-defining SSB 21 so that the UE has a long wakeup time each time. For example, a wakeup time 24 illustrated in FIG. 2 is relatively long. The non-cell-defining SSB 22 is mainly used for measurement and is configured by the base station in the RRC signaling. Since the UE may retain a configuration parameter for non-cell-defining SSB after the UE in a connected state enters an inactive state, the base station may add the indication information into the RRC signaling, for indicating whether the non-cell-defining SSB is capable of being used for establishing the paging synchronization.

The transmitting portion 52 is configured to transmit, to the UE, the RRC signaling added by the adding portion with the indication information and paging configuration information used for configuring a paging occasion respectively. The indication information and the paging configuration information jointly serve as a received information set of the UE.

In the above embodiment, by transmitting the RRC signaling added with the indication information and paging configuration information to UE, the UE is enabled to determine according to the information whether to adopt the non-cell-defining SSB or the cell-defining SSB to establish the paging synchronization, so as to reduce UE's active time. Thus, it is conducive to reducing the electricity energy consumed by the UE.

Figure 6:
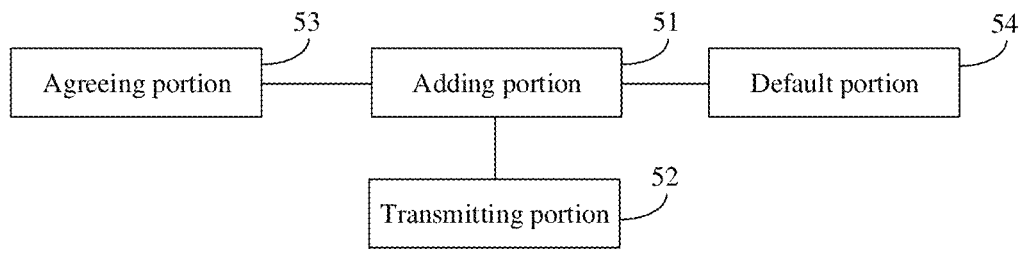
FIG. 6 is another block diagram of a device for indicating paging synchronization according to some embodiments of the present disclosure.

FIG. 6 is another block diagram of a device for indicating paging synchronization according to some embodiments of the present disclosure. As illustrated in FIG. 6, based on the embodiment illustrated in FIG. 5, the device further includes an agreeing portion 53 or a default portion 54.

The agreeing portion 53 is configured to agree with UE on whether a non-cell-defining SSB corresponding to indication information added by the adding portion 51 has a QCL relationship with a paging occasion.

The default portion 54 is configured to define by default whether the non-cell-defining SSB corresponding to the indication information added by the adding portion 51 has the QCL relationship with the paging occasion.

In some embodiments, if the non-cell-defining SSB does not have the QCL relationship with the paging occasion, the indication information is used for indicating that the non-cell-defining SSB is not capable of being used for establishing the paging synchronization. If the non-cell-defining SSB has the QCL relationship with the paging occasion, the indication information is used for indicating that the non-cell-defining SSB is capable of being used for establishing the paging synchronization.

In the above embodiment, by agreeing on or defining by default whether the non-cell-defining SSB has the QCL relationship with the paging occasion, the UE is thus enabled to determine whether to adopt the cell-defining SSB or the non-cell-defining SSB to establish the paging synchronization.

Figure 7:
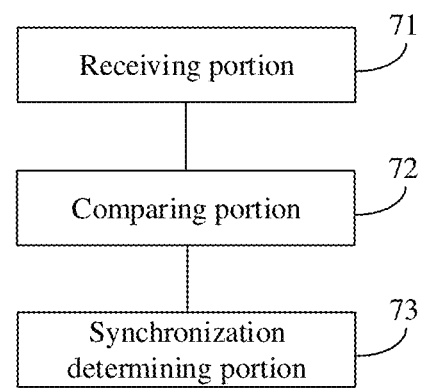
FIG. 7 is a block diagram of a device for paging synchronization according to some embodiments of the present disclosure.

FIG. 7 is a block diagram of a device for paging synchronization according to some embodiments of the present disclosure. The device may be located in UE. As illustrated in FIG. 7, the device includes a receiving portion 71, a comparing portion 72 and a synchronization determining portion 73.

The receiving portion 71 is configured to receive an RRC signaling and paging configuration information from a base station respectively, the RRC signaling including indication information, the indication information being used for indicating whether a non-cell-defining SSB is capable of being used for establishing paging synchronization, and the paging configuration information being used for configuring a paging occasion.

In some embodiments, the paging configuration information may also be used for configuring a position of the non-cell-defining SSB, herein the position of the non-cell-defining SSB is usually as close to the paging occasion as possible.

The comparing portion 72 is configured to compare a distance between the non-cell-defining SSB and the paging occasion received by the receiving portion 71 with a distance between a cell-defining SSB and the paging occasion received by the receiving portion 71 during a period in which an RRC connection is maintained.

The synchronization determining portion 73 is configured to adopt the non-cell-defining SSB to establish the paging synchronization, in response to that the comparing portion determines that the distance between the non-cell-defining SSB and the paging occasion is less than the distance between the cell-defining SSB and the paging occasion, and determines the non-cell-defining SSB has a QCL relationship with the paging occasion and the indication information is used for indicating that the non-cell-defining SSB is capable of being used for establishing the paging synchronization.

If the UE and the base station agree on that the non-cell-defining SSB has the QCL relationship with the paging occasion, it can be determined that the non-cell-defining SSB has the QCL relationship with the paging occasion. In addition, if the UE defines by default that the non-cell-defining SSB has the QCL relationship with the paging occasion, it can also be determined that the non-cell-defining SSB has the QCL relationship with the paging occasion.

In some embodiments, in response to that the distance between the non-cell-defining SSB and the paging occasion is less than the distance between the cell-defining SSB and the paging occasion, and in response to determining that the non-cell-defining SSB has the QCL relationship with the paging occasion and the indication information is used for indicating that the non-cell-defining SSB is capable of being used for establishing the paging synchronization, the UE establishes the paging synchronization at the position of the non-cell-defining SSB.

For example, in FIG. 2, since the distance between the non-cell-defining SSB 22 and the paging occasion, which is represented by the paging block 23, is less than the distance between the cell-defining SSB 21 and the paging occasion; furthermore, the UE determines that the non-cell-defining SSB has the QCL relationship with the paging occasion and the indication information is used for indicating that the non-cell-defining SSB is capable of being used for establishing the paging synchronization, the UE establishes the paging synchronization at the position of the non-cell-defining SSB. As can be seen from FIG. 2, a wakeup time 25 corresponding to the establishment of the paging synchronization at the position of the non-cell-defining SSB is less than the wakeup time 24 corresponding to the establishment of the paging synchronization at the position of the cell-defining SSB, it is thus conducive to reducing the electricity energy consumed by the UE.

In addition, if the non-cell-defining SSB does not have the QCL relationship with the paging occasion or the indication information is used for indicating that the non-cell-defining SSB is not capable of being used for establishing the paging synchronization, the UE establishes the paging synchronization at the position of the cell-defining SSB.

In the above embodiment, the non-cell-defining SSB is adopted to establish the paging synchronization in response to that the distance between the non-cell-defining SSB and the paging occasion is less than the distance between the cell-defining SSB and the paging occasion and in response to determining that the non-cell-defining SSB has the QCL relationship with the paging occasion and the indication information is used for indicating that the non-cell-defining SSB is capable of being used for establishing the paging synchronization. In this way, the UE's wakeup time is reduced, and it is thus conducive to reducing the electricity energy consumed by the UE.

Figure 8:
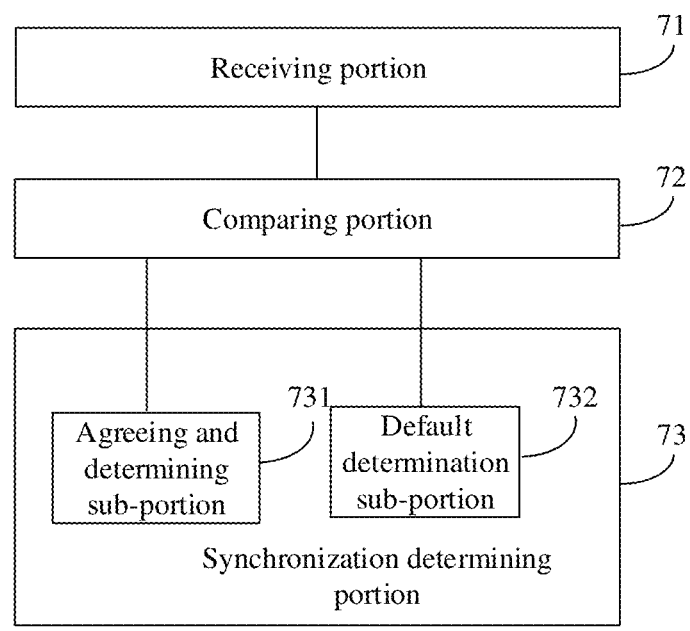
FIG. 8 is another block diagram of a device for paging synchronization according to some embodiments of the present disclosure.

FIG. 8 is another block diagram of a device for paging synchronization according to some embodiments of the present disclosure. As illustrated in FIG. 8, based on the embodiment illustrated in FIG. 7, the synchronization determining portion 73 may include an agreeing and determining sub-portion 731 or a default determination sub-portion 732.

The agreeing and determining sub-portion 731 is configured to agree with the base station on that the non-cell-defining SSB has a QCL relationship with a paging occasion.

The default determination sub-portion 732 is configured to define by default that the non-cell-defining SSB has the QCL relationship with the paging occasion.

In the above embodiment, it is a flexible implementation that the agreeing and determining sub-portion or the default determination sub-portion determines whether the non-cell-defining has the QCL relationship with the paging occasion.

Figure 9:
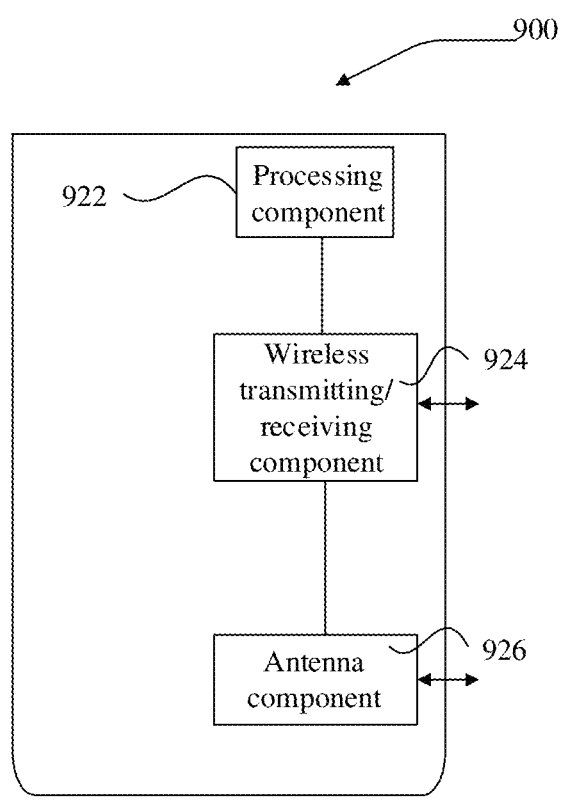
FIG. 9 is a block diagram of a device for indicating paging synchronization according to some embodiments of the present disclosure.

FIG. 9 is a block diagram of a device for indicating paging synchronization according to some embodiments of the present disclosure. A device 900 may be provided as a base station. As illustrated in FIG. 9, the device 900 includes a processing component 922, a wireless transmitting/receiving component 924, an antenna component 926 and a specific signal processing part of a wireless interface. The processing component 922 may further include one or more processors.

A processor in the processing component 922 may be configured to:

add indication information into an RRC signaling, the indication information being used for indicating whether a non-cell-defining SSB is capable of being used for establishing paging synchronization; and transmit, to UE, the RRC signaling added with the indication information and paging configuration information used for configuring a paging occasion respectively, herein the indication information and the paging configuration information jointly serve as a received information set of the UE.

In some embodiments of the present disclosure, a non-transitory computer-readable storage medium including an instruction is also provided. The above instruction may be executed by the processing component 922 of the device 900 to complete the above method for indicating paging synchronization. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device or the like.

Figure 10:
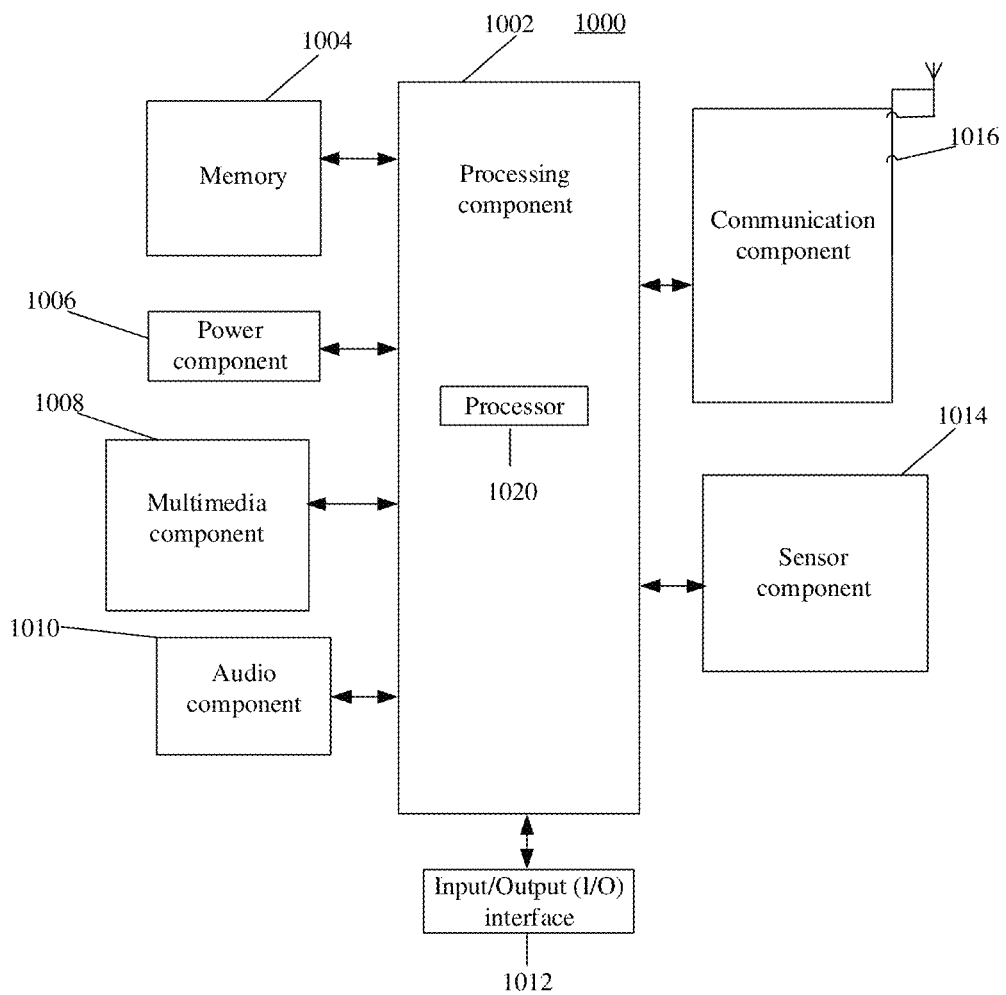
FIG. 10 is a block diagram of a device for paging synchronization according to some embodiments of the present disclosure.

FIG. 10 is a block diagram of a device for indicating paging synchronization according to some embodiments of the present disclosure. For example, a device 1000 may be UE such as a mobile phone, a computer, a digital broadcast terminal, a messaging device, a gaming console, a tablet, a medical device, exercise equipment and a personal digital assistant.

As illustrated in FIG. 10, the device 1000 may include one or more of the following components: a processing component 1002, a memory 1004, a power component 1006, a multimedia component 1008, an audio component 1010, an Input/Output (I/O) interface 1012, a sensor component 1014, and a communication component 1016.

The processing component 1002 typically controls overall operations of the device 1000, such as the operations associated with display, telephone calls, data communications, camera operations, and recording operations. The processing component 1002 may include one or more processors 1020 to execute instructions to perform all or part of the operations in the abovementioned method. Moreover, the processing component 1002 may include one or more modules which facilitate interaction between the processing component 1002 and the other components. For instance, the processing component 1002 may include a multimedia module to facilitate interaction between the multimedia component 1008 and the processing component 1002.

A processor 1020 in the processing component 1002 may be configured to:

receive an RRC signaling and paging configuration information from a base station respectively, the RRC signaling comprising indication information, the indication information being used for indicating whether a non-cell-defining SSB is capable of being used for establishing paging synchronization, and the paging configuration information being used for configuring a paging occasion;

compare a distance between the non-cell-defining SSB and the paging occasion with a distance between a cell-defining SSB and the paging occasion during a period in which an RRC connection is maintained; and adopt the non-cell-defining SSB to establish the paging synchronization, in response to that the distance between the non-cell-defining SSB and the paging occasion is less than the distance between the cell-defining SSB and the paging occasion, and in response to determining that the non-cell-defining SSB has a QCL relationship with the paging occasion and the indication information is used for indicating that the non-cell-defining SSB is capable of being used for establishing the paging synchronization.

The memory 1004 is configured to store various types of data to support the operation of the device 1000. Examples of such data include instructions for any application program or method operated on the device 1000, contact data, phonebook data, messages, pictures, video, etc. The memory 1004 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), an ROM, a magnetic memory, a flash memory, a magnetic or optical disk.

The power component 1006 provides power for various components of the device 1000. The power component 1006 may include a power management system, one or more power supplies, and other components associated with generation, management and distribution of power for the device 1000.

The multimedia component 1008 includes a screen providing an output interface between the device 1000 and a user. In some embodiments, the screen may include a Liquid Crystal Display (LCD), OLED and a Touch Panel (TP). In some embodiments, an organic light-emitting diode (OLED) display or other types of displays can be employed.

If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1008 includes a front camera and/or a rear camera. The front camera and/or the rear camera may receive external multimedia data when the device 1000 is in an operation mode, such as a photographing mode or a video mode. Each of the front camera and the rear camera may be a fixed optical lens system or have focusing and optical zooming capability.

The audio component 1010 is configured to output and/or input audio signals. For example, the audio component 1010 includes a Microphone (MIC), and the MIC is configured to receive an external audio signal when the device 1000 is in an operation mode, such as a call mode, a recording mode and a voice recognition mode. The received audio signal may further be stored in the memory 1004 or sent through the communication component 1016. In some embodiments, the audio component 1010 further includes a speaker configured to output the audio signal.

The I/O interface 1012 provides an interface between the processing component 1002 and a peripheral interface module, and the peripheral interface module may be a keyboard, a click wheel, a button and the like. The button may include, but not limited to: a home button, a volume button, a starting button and a locking button.

The sensor component 1014 includes one or more sensors configured to provide status assessment in various aspects for the device 1000. For instance, the sensor component 1014 may detect an on/off status of the device 1000 and relative positioning of components, such as a display and small keyboard of the device 1000, and the sensor component 1014 may further detect a change in a position of the device 1000 or a component of the device 1000, presence or absence of contact between the user and the device 1000, orientation or acceleration/deceleration of the device 1000 and a change in temperature of the device 1000. The sensor component 1014 may include a proximity sensor configured to detect presence of an object nearby without any physical contact. The sensor component 1014 may also include a light sensor, such as a Complementary Metal Oxide Semiconductor (CMOS) or Charge Coupled Device (CCD) image sensor, configured for use in an imaging application. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the device 1000 and another device. The device 1000 may access a communication-standard-based wireless network, such as a Wireless Fidelity (Wi-Fi), 2G, 3G, 4G, 5G or a combination thereof. In some embodiments of the present disclosure, the communication component 1016 receives a broadcast signal or broadcast associated information from an external broadcast management system through a broadcast channel. In some embodiments of the present disclosure, the communication component 1016 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the device 1000 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to perform the above described methods.

In some embodiments of the present disclosure, there is also provided a non-transitory computer-readable storage medium including an instruction, such as the memory 1004 including an instruction, and the instruction may be executed by the processor 1020 of the device 1000 to implement the above described methods. For example, the non-transitory computer-readable storage medium may be an ROM, an RAM, a CD-ROM, a magnetic tape, a floppy disc, an optical data storage device and the like.

As the device embodiment basically corresponds to the method embodiment, the descriptions on the device embodiment may make reference to the related contents of the method embodiment. The above-mentioned embodiments of the device are merely schematic and units described as separate part may be or not be separated physically. Components displayed as the units may be or not be physical units, i.e., may be located at one place or be distributed in multiple network units. Part or all of the portions may be chosen to implement the solutions in these embodiments of the disclosure according to an actual requirement. The embodiments of the disclosure may be understood and implemented by those skilled in the art without making any creative efforts.

It is to be noted that relation terms "first," "second" and the like in the present disclosure are adopted only to distinguish one entity or operation from another entity or operation and do not always require or imply existence of any such practical relationship or sequence between the entities or operations. Terms "include" and "have" or any other variation thereof are intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by the statement "including a/an . . . " does not exclude existence of another element that is the same in a process, method, object or device including the element.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for indicating paging synchronization, executed by a base station, the method comprising:
    adding indication information into a Radio Resource Control (RRC) signaling, the indication information being used for indicating whether a non-cell-defining Synchronization Signal Block (SSB) is capable of being used for establishing paging synchronization; and
    transmitting, to User Equipment (UE), the RRC signaling added with the indication information and paging configuration information used for configuring a paging occasion respectively, wherein the indication information and the paging configuration information jointly serve as a received information set of the UE, and are configured to enable the UE to determine whether to adopt the non-cell-defining SSB or a cell-defining SSB to establish the paging synchronization.

2. The method of claim 1, further comprising:
    agreeing with the UE on whether the non-cell-defining SSB has a Quasi-Collocated (QCL) relationship with the paging occasion; or
    defining by default whether the non-cell-defining SSB has the QCL relationship with the paging occasion.

3. The method of claim 1, wherein in response to that the non-cell-defining SSB does not have the QCL relationship with the paging occasion, the indication information is used for indicating that the non-cell-defining SSB is not capable of being used for establishing the paging synchronization; and
    in response to that the non-cell-defining SSB has the QCL relationship with the paging occasion, the indication information is used for indicating that the non-cell-defining SSB is capable of being used for establishing the paging synchronization.

4. A base station implementing the method of claim 1, wherein the base station is configured to transmit the RRC signaling added with the indication information and the paging configuration information to the UE, to thereby enable the UE to determine whether to adopt the non-cell-defining SSB or the cell-defining SSB to establish the paging synchronization, reduce the UE's active time and energy consumption.

5. A communication system comprising the base station of claim 4, further comprising the UE.

6. The communication system of claim 5, wherein the UE is configured to:
receive a Radio Resource Control (RRC) signaling and paging configuration information from a base station respectively, the RRC signaling comprising indication information, the indication information being used for indicating whether a non-cell-defining Synchronization Signal Block (SSB) is capable of being used for establishing paging synchronization, and the paging configuration information being used for configuring a paging occasion;
compare a distance between the non-cell-defining SSB and the paging occasion with a distance between a cell-defining SSB and the paging occasion during a period in which an RRC connection is maintained; and
adopt the non-cell-defining SSB to establish the paging synchronization, in response to that the distance between the non-cell-defining SSB and the paging occasion is less than the distance between the cell-defining SSB and the paging occasion, and in response to that the non-cell-defining SSB has a Quasi-Collocated (QCL) relationship with the paging occasion and the indication information is used for indicating that the non-cell-defining SSB is capable of being used for establishing the paging synchronization.

7. The communication system of claim 6, wherein in order to determine that the non-cell-defining SSB has the QCL relationship with the paging occasion, the UE is further configured to:
agree with the base station on that the non-cell-defining SSB has the QCL relationship with the paging occasion; or
define by default that the non-cell-defining SSB has the QCL relationship with the paging occasion.

8. The communication system of claim 7, wherein the configuration information is further used for configuring a position of the non-cell-defining SSB,
wherein in order to adopt the non-cell-defining SSB to establish the paging synchronization, the UE is further configured to:
establish the paging synchronization in the position of the non-cell-defining SSB.

9. The communication system of claim 8, wherein the non-cell-defining SSB is adopted to establish the paging synchronization in response to that:
the distance between the non-cell-defining SSB and the paging occasion is less than the distance between the cell-defining SSB and the paging occasion; and
the non-cell-defining SSB has the QCL relationship with the paging occasion and the indication information is used for indicating that the non-cell-defining SSB is capable of being used for establishing the paging synchronization;

such that the UE's wakeup time and energy consumption are reduced.

10. A method for paging synchronization, executed by User Equipment (UE), the method comprising:
receiving a Radio Resource Control (RRC) signaling and paging configuration information from a base station respectively, the RRC signaling comprising indication information, the indication information being used for indicating whether a non-cell-defining Synchronization Signal Block (SSB) is capable of being used for establishing paging synchronization, and the paging configuration information being used for configuring a paging occasion;
comparing a distance between the non-cell-defining SSB and the paging occasion with a distance between a cell-defining SSB and the paging occasion during a period in which an RRC connection is maintained; and
adopting the non-cell-defining SSB to establish the paging synchronization, in response to that the distance between the non-cell-defining SSB and the paging occasion is less than the distance between the cell-defining SSB and the paging occasion, and in response to determining that the non-cell-defining SSB has a Quasi-Collocated (QCL) relationship with the paging occasion and the indication information is used for indicating that the non-cell-defining SSB is capable of being used for establishing the paging synchronization.

11. The method of claim 10, wherein determining that the non-cell-defining SSB has the QCL relationship with the paging occasion comprises:
agreeing with the base station on that the non-cell-defining SSB has the QCL relationship with the paging occasion; or
defining by default that the non-cell-defining SSB has the QCL relationship with the paging occasion.

12. The method of claim 10, wherein the configuration information is further used for configuring a position of the non-cell-defining SSB,
wherein adopting the non-cell-defining SSB to establish the paging synchronization comprises:
establishing the paging synchronization in the position of the non-cell-defining SSB.

13. A device for indicating paging synchronization, comprising:
a processor; and
memory configured to store instructions executable by the processor,
wherein the processor is configured to:
add indication information into a Radio Resource Control (RRC) signaling, the indication information being used for indicating whether a non-cell-defining Synchronization Signal Block (SSB) is capable of being used for establishing paging synchronization; and
transmit, to User Equipment (UE), the RRC signaling added with the indication information and paging configuration information used for configuring a paging occasion respectively, wherein the indication information and the paging configuration information jointly serve as a received information set of the UE, and are configured to enable the UE to determine whether to adopt the non-cell-defining SSB or a cell-defining SSB to establish the paging synchronization.

14. The device of claim 13, wherein the processor is further configured to:
agree with the UE on whether the non-cell-defining SSB has a Quasi-Collocated (QCL) relationship with the paging occasion; or define by default whether the non-cell-defining SSB has the QCL relationship with the paging occasion.

15. The device of claim 13, wherein in response to that the non-cell-defining SSB does not have the QCL relationship with the paging occasion, the indication information is used for indicating that the non-cell-defining SSB is not capable of being used for establishing the paging synchronization; and in response to that the non-cell-defining SSB has the QCL relationship with the paging occasion, the indication information is used for indicating that the non-cell-defining SSB is capable of being used for establishing the paging synchronization.

16. A device for paging synchronization, comprising:
a processor; and
memory configured to store instructions executable by the processor,
wherein the processor is configured to:
receive a Radio Resource Control (RRC) signaling and paging configuration information from a base station respectively, the RRC signaling comprising indication information, the indication information being used for indicating whether a non-cell-defining Synchronization Signal Block (SSB) is capable of being used for establishing paging synchronization, and the paging configuration information being used for configuring a paging occasion;
compare a distance between the non-cell-defining SSB and the paging occasion with a distance between a cell-defining SSB and the paging occasion during a period in which an RRC connection is maintained; and
adopt the non-cell-defining SSB to establish the paging synchronization, in response to that the distance between the non-cell-defining SSB and the paging occasion is less than the distance between the cell-defining SSB and the paging occasion, and in response to that the non-cell-defining SSB has a Quasi-Collocated (QCL) relationship with the paging occasion and the indication information is used for indicating that the non-cell-defining SSB is capable of being used for establishing the paging synchronization.

17. The device of claim 16, wherein in order to determine that the non-cell-defining SSB has the QCL relationship with the paging occasion, the processor is configured to:

agree with the base station on that the non-cell-defining SSB has the QCL relationship with the paging occasion; or define by default that the non-cell-defining SSB has the QCL relationship with the paging occasion.

18. The device of claim 16, wherein the configuration information is further used for configuring a position of the non-cell-defining SSB, wherein in order to adopt the non-cell-defining SSB to establish the paging synchronization, the processor is configured to:

establish the paging synchronization in the position of the non-cell-defining SSB.

* * * * *